United States Patent [19]

Gay et al.

[11] 3,900,519

[45] Aug. 19, 1975

[54] PROCESS FOR PREPARING PARA-FLUOROANILINES

[75] Inventors: Walter A. Gay, Cheshire; John H. Tobin, Hamden, both of Conn.

[73] Assignee: Olin Corporation, New Haven, Conn.

[22] Filed: June 11, 1973

[21] Appl. No.: 366,946

[52] U.S. Cl. ................................................. 260/580
[51] Int. Cl.² ............................................ C07C 85/11
[58] Field of Search .................................... 260/580

[56] References Cited
UNITED STATES PATENTS 3,558,707   1/1971   Churchill et al. .................... 260/580

OTHER PUBLICATIONS

Finger et al., "J.A.C.S.," Vol. 78, pp. 6034–6036 (1956).

Noller, "Chemistry of Organic Cmpds.," (3rd ed.), pp. 802–803 (1965).

*Primary Examiner*—Lewis Gotts
*Assistant Examiner*—S. P. Williams
*Attorney, Agent, or Firm*—Robert L. Andersen

[57] ABSTRACT

Para-fluoroanilines are prepared by a one-step method from the corresponding para-halonitrobenzenes by reaction with anhydrous hydrogen fluoride in the presence of a deoxygenating agent.

9 Claims, No Drawings

PROCESS FOR PREPARING PARA-FLUOROANILINES

This invention relates to a one-step method for the preparation of p-fluoroaniline and substituted derivatives thereof. More particularly, this invention involves the reaction of selected p-halonitrobenzenes with anhydrous hydrogen fluoride in the presence of a doxygenating agent to form the respective p-fluoroaniline compound.

Para-fluoroaniline is a well-known compound having utility as an intermediate in the manufacture of various dye stuffs including hair dyes, agricultural pesticides including fungicides, and various pharmacological compounds. Previous methods for preparing p-fluoroaniline include: (1) the diazotization of aniline to form fluorobenzene followed by nitration and subsequent reduction of the resulting p-fluoronitrobenzene; (2) the displacement of chloride by fluoride using a Finger reaction on p-chloronitrobenzene followed by reduction of the resulting p-fluoronitrobenzene; (3) the catalytic hydrogenation of nitrobenzene as disclosed in U.S. Pat. No. 2,844,458 issued Apr. 28, 1959 to D. Fidler; (4) the deoxygenation and hydrofluorination of nitrobenzene in the presence of carbon monoxide and a noble metal catalyst as disclosed in U.S. Pat. No. 3,639,482 issued Feb. 1, 1972 to Churchill et al and (5) the deoxygenation and hydrofluorination of nitrobenzene in the presence of hydrogen fluoride and a deoxygenating agent as disclosed in U.S. Pat. No. 3,558,707 issued Jan. 26, 1971 to Churchill et al. The first two methods noted above involve a multiplicity of steps and the latter three methods involve a difficult separation technique since significant amounts of aniline are formed along with p-fluoroaniline and the difference in boiling points in such products is only about 3.5°C.

Now it has been found that p-fluoroaniline and selected substituted derivatives thereof can be conveniently and economically provided in a direct one-step conversion from p-halonitrobenzenes. More particularly, the method of this invention involves the reaction of selected p-halonitrobenzenes in hydrogen fluoride in the presence of a deoxygenating agent as shown by the following equation wherein for example p-chhloronitrobenzene is the starting material and phosphorus is the deoxygenating agent:

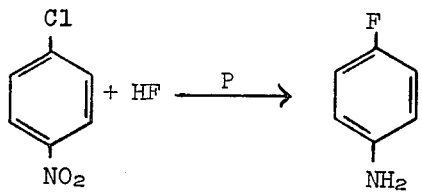

The particular advantage of the method of this invention is that besides involving a direct one-step conversion, it significantly involves the formation of two readily separable products, i.e. p-fluoroaniline and p-chloroaniline; thus the separation and recovery of the desired product is economically feasible and the overall method economically attractive. Additionally, the method of this invention was particularly surprising and unexpected since it involves the simultaneous replacement of chloride with fluoride and the reduction of the nitro group to an amino group. As indicated in the previously noted '707 patent, the preparation of p-fluoroaniline from nitrobenzene was effected using a technique wherein the para position to the nitro group was open. It would be expected when using a starting para substituted halonitrobenzene in the method as disclosed herein, that the resulting product would merely be reduced in the nitro position leaving the halo group unaffected. Surprisingly and unexpectedly, it was found that not only was the nitro group reduced but also the para positioned halo group was simultaneously replaced with fluoride resulting in a p-fluoroaniline compound.

The starting materials for this invention include p-halonitrobenzenes having the following general formula:

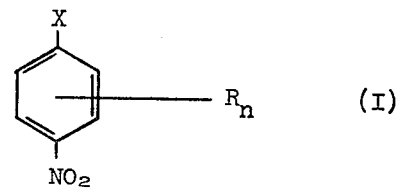

wherein X is a halogen and more particularly a halo selected from the group consisting of chlorine, bromine and iodine, preferably chlorine and bromine; each R is independently selected from the group consisting of halogen and more particularly chlorine, bromine, iodine, and fluorine, alkyl and more particularly alkyl of 1 to 4 carbon atoms and aryl and more particularly aryl of 6 to 10 carbon atoms and $n$ is an integer of 0 to 4. Other derivatives of p-halonitrobenzene having one or more innocuous substituents such as carboxyl and trifluoromethyl may also be used as a starting material and are considered within the scope of this invention. Illustrative of the above starting materials (I) are the following compounds: p-chloronitrobenzene, p-bromonitrobenzene, p-iodonitrobenzene, 2,4-dichloronitrobenzene, 3,4-dichloronitrobenzene, 2-fluoro-4-chloronitrobenzene, 3-fluoro-4-chloronitrobenzene, 2-methyl-4-chloronitrobenzene, 3-ethyl-4-bromonitrobenzene, 2-butyl-4-chloronitrobenzene, 2,3-dimethyl-4-chloronitrobenzene, 2-methyl-5-propyl-4-bromonitrobenzene and 2,3,5-trimethyl-4-chloronitrobenzene.

The deoxygenating agents which may be used in the method of this invention include elemental phosphorus, elemental sulfur, phosphorus trihalides, sulfur halides in which sulfur has a valence lower than 6, aryl phosphorus halides, aryl sulphenyl halides and triaryl phosphines. Illustrative examples of such deoxygenating agents include red or yellow elemental phosphorus, elemental sulfur in any of its allotropic forms, phosphorus and sulfur halides including the fluorides, chlorides, bromides and iodides of trivalent phosphorus and of sulfur lower in valence than 6, e.g. $PF_3$, $PCl_3S_2Cl_2$, $SCl_2$, $SCl_4$ and $S_2Br_2$. Illustrative aryl phosphorus and sulfur halides include e.g. diphenyl phosphorus chloride, di-p-tolyl phosphorus chloride and benzene sulphenyl chloride. Illustrative triaryl phosphines include e.g. triphenyl phosphine, tri-o-tolyl phosphine, tri-p-tolyl phosphine and tri-bromophenylphosphine. Mixtures of these deoxygenating agents may also be used.

In carrying out the method of this invention, it is preferable that anhydrous hydrogen fluoride is used and the minimum desired molar ratio of hydrogen fluoride to selected p-halonitrobenzene is 1:1. While lesser amounts can be used, the yields will suffer. More particularly, a molar ratio of hydrogen fluoride to selected p-halonitrobenzene of at least 1:1 to about 50:1 may be used and preferably from about 10:1 to about 30:1. Greater amounts of hydrogen fluoride may be used, if desired.

The amount of deoxygenating agent used will generally be at least a 0.3:1 molar ratio of deoxygenating agent to selected p-halonitrobenzene. While lesser amounts can be used, the yields will suffer. Preferably the molar ratio will be at least 0.5:1 and ratios up to about 5:1 are suitable but more of the deoxygenating agent appears unnecessary.

The method of this invention may be carried out at temperatures of from about 0° to about 230°C. and preferably from about 100° to about 20°C. Generally the reaction is carried out at autogenous pressure. More particularly the pressure will vary from about 15 to about 3,000 psia. and preferably from about 100 to about 1,500 psia.

The time required for the reaction is not particularly critical and will vary widely with different conditions. Generally satisfactory yields will be obtained in from about 1 to about 10 hours, however, more or less time may be used if desired.

After the reaction has been carried out to produce the desired p-fluoroaniline product, the product can be readily separated from the reaction mixture by conventional means such as simple extraction, distillation or fractional crystallization.

The following examples further illustrate the method of this invention.

EXAMPLE I

To a 300 cc Monel shaking type autoclave was charged 15.8 g (0.1 mole) p-chloronitrobenzene and 4.65 g (0.15 g atom) red phosphorus. The autoclave was cooled to −40°C. and kept under a nitrogen purge. After the reactor had been sufficiently cooled, 60 g (3.0 mole) anhydrous hydrogen fluoride was added, the reactor sealed, and heated with shaking to 150°C. for 6 hrs. at 570 psig and then allowed to cool to room temperature. Residual pressure was 120 psig at 25°C. The gases were vented and the hydrogen fluoride allowed to evaporate overnight.

The residue was diluted with approximately 100 cc. of cold water and 6.4 g. solid was removed by filtration. Gas chromatographic analysis showed this to contain 3.5 g. (19.5 mole) p-chloronitrobenzene and 1.5 g (11.7 mmole) p-chloroaniline. Conversion correspond to 80.5 percent. Corrected yield of p-chloroaniline was 14.7 percent.

The filtrate was neutralized at 0°C to a pH of 7.5 using 20% potassium hydroxide. An extraction with diethyl ether provided 5.4 g of an oil upon removal of solvent by flash distillation under reduced pressure. Gas chromatographic analysis of the oil showed p-fluoroaniline (99+ % assay) corresponding to a 45.6 percent uncorrected yield and a 56.7 percent corrected yield of p-fluoroaniline.

The identification of prepared compounds was confirmed by infrared analysis and nuclear magnetic resonance spectroscopy.

EXAMPLE II

To a 300 cc Monel shaking type autoclave was charged 15.8 g (0.1 mole) p-chloronitrobenzene and 52.4 g (0.2 mole) triphenylphosphine. The reactor was cooled under nitrogen as in Example I to −40°C, charged with 60 g (3.0 mole) anhydrous hydrogen fluoride and sealed. The reactor was heated with shaking at 150°C. and 275 psig for 6 hrs. and then allowed to cool to room temperature. No significant residual pressure was noted.

After venting off minor amounts of gas the hydrogen fluoride was allowed to evaporate from the reaction mixture overnight. The residue was diluted with 200 cc of water and removed by filtration. Ether extraction of the residue followed by concentration under reduced pressure yielded 10.9 mmole p-chloronitrobenzene, corresponding to a conversion of 89.0 percent.

The remaining water solution was neutralized at 10°–20°C. with 20 percent potassium hydroxide to a pH of 7.5, saturated with sodium chloride, and extracted with diethyl ether. Removal of solvent by flash distillation under reduced pressure gave a residue of 8.8 g which, when analyzed by gas chromatographic analysis, showed 45.3 mmol p-fluoroaniline (52.8 percent corrected yield) and 15.5 mmol p-chloroaniline (18.0 percent corrected yield).

The identification of prepared compounds was confirmed by infrared analysis and nuclear magnetic resonance spectroscopy.

EXAMPLE III

To a 300 cc of Monel shaking type autoclave was charged 15.8 g (0.1 mole) p-chloronitrobenzene and the autoclave was cooled to −40°C with a nitrogen purge. After charging 60 g (3.0 mole) anhydrous hydrogen fluoride, the autoclave was sealed and 23.0 g (0.28 mole) phosphorus trifluoride introduced at 25°C. to a reactor pressure of 175 psig.

After heating for 6 hrs. at 150°C. to a maximum pressure of 960 psig. the reactor was allowed to cool to room temperature giving a residual pressure of 350 psig. at 25°C. The gases were vented and the reaction mixture diluted with 100 cc water. Filtration yielded 1.0 g (6.4 mmole pure) p-chloronitrobenzene as residue; thus, resulting in a 93.6 percent conversion.

The filtrate was neutralized at 10°–20°C with 20% potassium hydroxide and extracted with diethyl ether. Upon concentration under reduced pressure there was obtained 10.2 g of an oil which, when analyzed by gas chromatographic analysis, showed 56.3 mmole p-fluoroaniline (60.1% corrected yield) and 22.6 mmole p-chloroaniline (24.1% corrected yield).

The identification of prepared compounds was confirmed by infrared analysis and nuclear magnetic resonance spectroscopy.

EXAMPLE IV

To a 300 cc Monel shaking type autoclave was charged 19.2 g (0.1 mole) 2,4-dichloronitrobenzene and 4.65 g (0.15 g atom) red phosphorus. After cooling under nitrogen to −40°C the reactor was charged with 60 g (3.0 mole) anhydrous hydrogen fluoride, sealed and heated to 150°C at 580 psig for 6 hrs. Upon cooling to room temperature a residual pressure of 120 psig was noted. Following the venting of the gases the reaction mixture was added dropwise to 375 g of 48% potassium hydroxide at −10°C. After the addition of an additional 200 cc water the basified reaction mixture was steam distilled to yield 13.9 g of an oil which, when analyzed by gas chromatography, was found to contain 14.8 mmole 2,4-dichloronitrobenzene, (85.2% conv.) 39.4 mmole 2-chloro-4-fluoroaniline (46.3% corrected yield) and 13.7mmole 2,4-dichloroaniline (16.1% corrected yield).

EXAMPLE V

To a 300 cc Monel shaking type autoclave was charged 15.8 g (0.1 mole) p-chloronitrobenzene. The vessel was cooled under nitrogen to −40°and further charged with 60 g (3.0 mole) anhydrous hydrogen fluoride and 4.7 g (0.15 g atom) yellow phosphorus. The vessel was then sealed and heated with shaking to 150°C at 545 psig for 6 hrs. Upon cooling the reaction mixture, a residual pressure of 100 psig was noted.

The residual gases were vented and the acidic solution was basfied at −10°C by dropwise addition to 370 g, 48% potassium hydroxide. The mixture was steam distilled after adding 200 cc of water to obtain 10.3 g of liquid.

Gas chromatographic analysis of the oil showed 0.05 mmole p-chloronitrobenzene (95% conversion) 47.0 mmole p-fluoroaniline (49.4% corrected yield), and 36.9 mmole p-chloroaniline (37.8% corrected yield).

The identification of prepared compounds was confirmed by infrared analysis and nuclear magnetic resonance spectroscopy.

EXAMPLE VI

To a 300 cc Monel shaking type autoclave was charged 15.8 g (0.1 mole) p-chloronitrobenzene and 4.8 g (0.15 g atom) sulfur. After cooling under nitrogen to −40°C. 60 g (3.0 mole) anhydrous hydrogen fluoride was added and the vessel sealed. After heating the reaction mixture for 6 hrs. at 150°C and 460 psig cooling to room temperature resulted in no significant residual pressure.

The acidic solution was basified at −10°C by the dropwise addition to 370 g 48% potassium hydroxide. The mixture was steam distilled after adding 200 cc water to obtain 7.9 g of organic product.

Gas chromatographic analysis of the oil showed 38.4 mmole p-chloronitrobenzene (61.1% conversion), 5.8 mmole p-fluoroaniline (9.4% corrected yield) and 6.6 mmole p-chloroaniline (10.8% corrected yield).

The identification of prepared compounds was confirmed by infrared analysis and nuclear magentic resonance spectroscopy.

EXAMPLE VII

To a 300 cc stainless steel stirring type autoclave at −40°C was charged under nitrogen 20.2 g (0.1 mole) p-bromonitrobenzene, 4.65 g (0.15 g atom) red phosphorus and 60 g (3.0 mole) anhydrous hydrogen fluoride. After sealing the reactor, the reaction mixture was heated with stirring for 6 hrs. at 150°C. The reaction mixture was cooled to room temperature and the gases released from the reactor. The acidic solution was basified at −10°C by the dropwise addition to 370 g 48% potassium hydroxide and steam distilled to yield 11.9 g of organic product.

Gas chromatographic analysis of the oil showed 4.2 mmole p-bromonitrobenzene (95.8conversion), 28.5 mmole p-fluoroaniline (30.0% corrected yield) and 44.8 mmole p-bromoaniline (47.1% corrected yield).

The identification of prepared compounds was confirmed by infrared analysis and nuclear magnetic resonance spectroscopy.

What is claimed is:

1. A method for preparing p-fluoroaniline and substituted p-fluoroanilines which comprises reacting a compound of the formula:

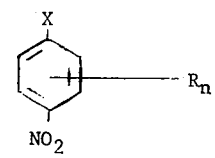

where X is a halogen selected from the group consisting of chlorine, bromine and iodine; each R is independently selected from the group consisting of halogen and alkyl of 1 to 4 carbon atoms; and $n$ is an interger of 0 to 4 with anhydrous hydrogen fluoride in the presence of a deoxygenating agent selected from the group consisting of elemental phosphorus, elemental sulfur, phosphorus trihalides, sulfur halides in which sulfur has a valence lower than 6, aryl phosphorus halides, aryl sulphenyl halides and triaryl phosphines.

2. The method of claim 1 wherein said reaction is carried out at a temperature of from about 0° to about 230°C.

3. The method of claim 2 wherein said reaction is run under a pressure of from about 15 to about 3000 psia.

4. The method of claim 3 wherein the molar ratio of said hydrogen fluoride to said compound is at least 1:1 and the molar ratio of said deoxygenating agent to said compound is at least 0.3:1.

5. The method of claim 4 wherein X is chlorine or bromine.

6. The method of claim 5 wherein said compound is p-chloronitrobenzene.

7. The method of claim 6 wherein said temperature is from about 100° to about 200°C and said pressure is from about 100 to about 1500 psia.

8. The method of claim 5 wherein said deoxygenating agent is selected from the group consisting of elemental phosphorus, elemental sulfur, triphenylphosphine and phosphorus trifluoride.

9. The method of claim 5 wherein said compound is p-bromonitrobenzene.

* * * * *